(12) United States Patent
Wang et al.

(10) Patent No.: US 12,466,366 B2
(45) Date of Patent: Nov. 11, 2025

(54) AUTOMATIC EMERGENCY BRAKING DEVICE

(71) Applicant: HITACHI ASTEMO, LTD., Hitachinaka (JP)

(72) Inventors: Jian Wang, Tokyo (JP); Taku Takahama, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/553,273

(22) PCT Filed: Mar. 1, 2022

(86) PCT No.: PCT/JP2022/008638
§ 371 (c)(1),
(2) Date: Sep. 29, 2023

(87) PCT Pub. No.: WO2023/026522
PCT Pub. Date: Mar. 2, 2023

(65) Prior Publication Data
US 2024/0174203 A1    May 30, 2024

(30) Foreign Application Priority Data
Aug. 24, 2021 (JP) .................................. 2021-136689

(51) Int. Cl.
*B60T 7/22*    (2006.01)
(52) U.S. Cl.
CPC ........... *B60T 7/22* (2013.01); *B60T 2201/022* (2013.01); *B60T 2210/32* (2013.01);
(Continued)
(58) Field of Classification Search
CPC .. B60T 7/22; B60T 2201/022; B60T 2210/32; B60T 2250/03; B60T 2250/04;
(Continued)

(56) References Cited

U.S. PATENT DOCUMENTS 11,970,181 B2 *  4/2024  Baek ..................... B60W 50/14
12,005,894 B2 *  6/2024  Takahashi ........... B60W 30/095
(Continued)

FOREIGN PATENT DOCUMENTS

JP          4615856 B2 *  1/2011   ................ B60T 7/22
JP       2018-156253 A    10/2018
(Continued)

OTHER PUBLICATIONS

International Search Report with English Translation and Written Opinion of International Patent Application No. PCT/JP2022/008638 dated May 24, 2022 (8 pages).

*Primary Examiner* — Hai H Huynh
(74) *Attorney, Agent, or Firm* — Foley & Lardner LLP

(57) ABSTRACT

An automatic emergency braking device, which is configured to prevent delay and malfunction of an automatic emergency brake when a vehicle enters an opposite lane, includes a collision determination unit that executes a collision determination for determining a possibility of collision between the vehicle and an oncoming vehicle. The automatic emergency braking device further includes a brake control unit that activates the automatic emergency brake according to the determination result of the collision determination, and an execution timing change unit that changes the execution timing of the collision determination. The execution timing change unit includes a determination unit that determines whether a prediction condition indicating prediction of entry of the vehicle to the opposite lane is satisfied, and a setting unit that, when the condition is satisfied, sets the execution timing of the collision determination earlier than the timing in the case where the condition is not satisfied.

5 Claims, 4 Drawing Sheets

(52) U.S. Cl.
CPC ....... *B60T 2220/03* (2013.01); *B60T 2250/03* (2013.01); *B60T 2250/04* (2013.01)

(58) Field of Classification Search
CPC ............ B60T 8/17558; B60T 2220/03; B60W 30/0956; B60W 30/18154; G08G 1/166; G08G 1/167; G01S 17/931; G01S 2013/9323; G01S 2013/93271
USPC .......................................................... 701/70
See application file for complete search history.

(56) References Cited

U.S. PATENT DOCUMENTS

| | | |
|---|---|---|
| 2018/0268702 A1 | 9/2018 | Morotomi et al. |
| 2020/0331467 A1 | 10/2020 | Ohmura et al. |
| 2021/0394754 A1 | 12/2021 | Takahashi et al. |

FOREIGN PATENT DOCUMENTS

| | | |
|---|---|---|
| JP | 2020-142665 A | 9/2020 |
| JP | 2020-175795 A | 10/2020 |

\* cited by examiner

AUTOMATIC EMERGENCY BRAKING DEVICE

TECHNICAL FIELD

The present invention relates to an automatic emergency braking device.

BACKGROUND ART

There is known a driving assistance device having an automatic emergency braking function for avoiding collision with an oncoming vehicle when a vehicle enters an opposite lane, such as when the vehicle turns right at an intersection of a left traffic road (for example, PTL 1).

PTL 1 discloses a vehicle traveling control device that sets a position where the own vehicle should stop without colliding with an oncoming vehicle as a "virtual wall" in consideration of a relative speed of the oncoming vehicle with respect to the own vehicle and a road shape, and operates an automatic emergency brake.

CITATION LIST

Patent Literature

PTL 1: JP 2020-175795 A

SUMMARY OF INVENTION

Technical Problem

An automatic emergency braking device determines whether or not to activate a brake in accordance with a result of collision determination between the own vehicle and an oncoming vehicle. When the own vehicle enters the opposite lane, as the vehicle speed of the own vehicle is faster, the time when the own vehicle starts steering is earlier. Therefore, the automatic emergency braking device needs to execute collision determination at an early stage. However, if the automatic emergency braking device executes the collision determination too early, there is a high possibility of occurrence of malfunction in which the brake is activated even when activation of the brake becomes unnecessary. On the other hand, if the automatic emergency braking device does not execute the collision determination at an early stage in order to prevent the malfunction, there is a high possibility that activation of the brake is delayed.

The vehicle traveling control device disclosed in PTL 1 only performs collision determination from the relationship between the position and the speed of an oncoming vehicle and the route of the own vehicle, and there is room for improvement in achieving both prevention of delay and prevention of malfunction of the automatic emergency brake.

The present invention has been made in view of the above, and an object of the present invention is to provide an automatic emergency braking device capable of achieving both prevention of delay and prevention of malfunction of the automatic emergency brake when a vehicle enters the opposite lane.

Solution to Problem

In order to solve the above problem, an automatic emergency braking device according to the present invention includes a collision determination unit that executes collision determination to determine whether or not there is a possibility of collision between an own vehicle and an oncoming vehicle, a brake control unit that activates an automatic emergency brake of the own vehicle according to a determination result of the collision determination, and an execution timing change unit that changes execution timing of the collision determination. The execution timing change unit includes a determination unit that determines whether or not a prediction condition indicating that entry of the own vehicle into an opposite lane is predicted is satisfied, and a setting unit that, when the prediction condition is satisfied, sets the execution timing of the collision determination to be earlier than a timing in the case where the prediction condition is not satisfied.

Advantageous Effects of Invention

According to the present invention, it is possible to provide an automatic emergency braking device capable of achieving both prevention of delay and prevention of malfunction of the automatic emergency brake when a vehicle enters an opposite lane.

Problems, configurations, and effects other than those described above will be clarified by the following description of embodiments.

DESCRIPTION OF EMBODIMENTS

Figure 1:
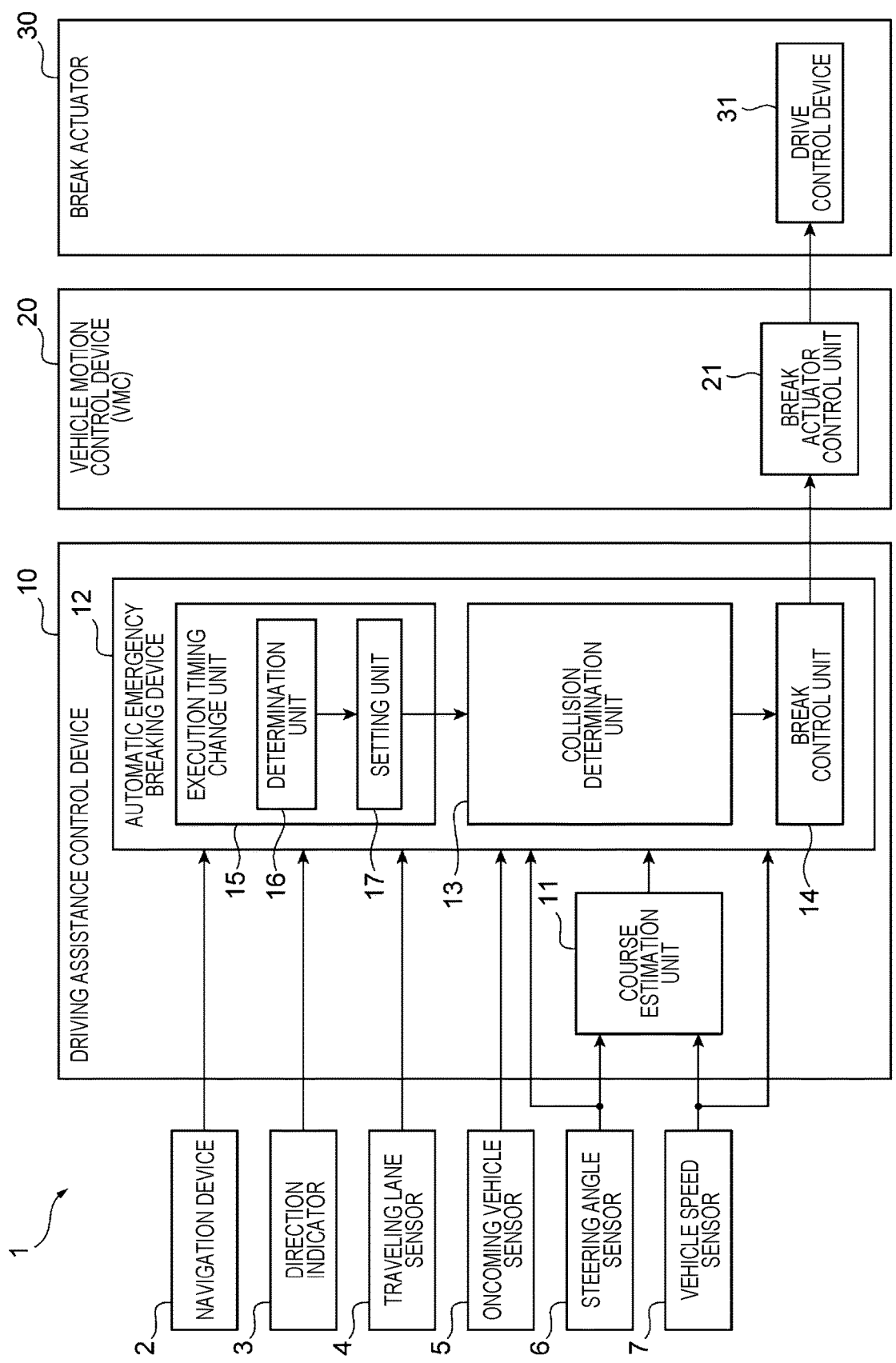
FIG. 1 is a diagram illustrating a functional configuration of a vehicle equipped with an automatic emergency braking device according to a first embodiment.

Hereinafter, embodiments of the present invention will be described with reference to the drawings. Configurations denoted by the same reference numerals in the respective embodiments have the same functions in the respective embodiments, and the description thereof will be omitted unless otherwise specified.

First Embodiment

An automatic emergency braking device 12 according to a first embodiment will be described with reference to FIGS. 1 to 3.

FIG. 1 is a diagram illustrating a functional configuration of a vehicle 1 equipped with an automatic emergency braking device 12 according to the first embodiment.

The vehicle 1 is a vehicle equipped with the automatic emergency braking device 12. The vehicle 1 of the present embodiment is a vehicle equipped with an advanced driver assistance system (ADAS) that assists driver's driving. The vehicle 1 may be a vehicle equipped with an automatic driving system (ADS) that realizes autonomous traveling. In the present embodiment, the vehicle 1 may be referred to as an own vehicle in order to clarify that the vehicle 1 is different from other vehicles.

The vehicle 1 includes a navigation device 2, a direction indicator 3, a traveling lane sensor 4, an oncoming vehicle sensor 5, a steering angle sensor 6, a vehicle speed sensor 7, a driving assistance control device 10, a vehicle motion control device (VMC) 20, and a brake actuator 30.

The navigation device 2 includes a GNSS receiver that acquires position information of the vehicle 1. The navigation device 2 includes a storage device that stores map information including road information such as lanes and intersections, and stores travel history information of the vehicle 1 including information on past travel routes. The direction indicator 3 notifies information that gives notice that the vehicle 1 will turn right or left. The steering angle sensor 6 detects a steering angle of the vehicle 1. The vehicle speed sensor 7 detects the vehicle speed of the vehicle 1.

The traveling lane sensor 4 includes a monocular camera, a stereo camera, or the like, and recognizes the traveling lane of the vehicle 1. The traveling lane sensor 4 can measure a yaw angle of the vehicle 1 with respect to the traveling lane of the vehicle 1 (a rotation angle of the vehicle 1 around an axis extending in the vertical direction of the vehicle 1). The yaw angle of the vehicle 1 with respect to the traveling lane of the vehicle 1 may be measured by the automatic emergency braking device 12 or the driving assistance control device 10 on the basis of the information of the traveling lane of the vehicle 1 recognized by the traveling lane sensor 4.

The oncoming vehicle sensor 5 includes a radar, a Lider, a stereo camera, or the like, and recognizes an oncoming vehicle and an opposite lane. The oncoming vehicle sensor 5 measures a relative distance and a relative speed between the vehicle 1 and the oncoming vehicle. The relative distance and the relative speed between the vehicle 1 and the oncoming vehicle may be measured by the automatic emergency braking device 12 or the driving assistance control device 10 on the basis of information of the oncoming vehicle and the opposite lane recognized by the oncoming vehicle sensor 5.

The driving assistance control device 10 is a controller that controls each component of an advanced driving assistance system (ADAS). The driving assistance control device 10 includes a processor and a memory, and realizes various functions of the ADAS by the processor executing a program stored in the memory. The driving assistance control device 10 includes a course estimation unit 11 and an automatic emergency braking device (AEB) 12. The driving assistance control device 10 may include an adaptive cruise control (ACC), a lane keeping assistant system (LKAS), or the like.

The course estimation unit 11 estimates a course on which the vehicle 1 travels, based on the steering angle of the vehicle 1 detected by the steering angle sensor 6 and the vehicle speed of the vehicle 1 detected by the vehicle speed sensor 7. The course estimation unit 11 outputs information on the estimated course of the vehicle 1 (hereinafter also referred to as "estimated course") to the collision determination unit 13. The course estimation unit 11 may be included in the automatic emergency braking device 12.

The automatic emergency braking device 12 is a device that automatically activates a brake to avoid collision between the vehicle 1 and a surrounding object on the basis of the state of the vehicle 1 during traveling and the surrounding environment of the vehicle 1. In particular, when the vehicle 1 enters the opposite lane such as when turning right at an intersection of a left traffic road or turning left at an intersection of a right traffic road, the automatic emergency braking device 12 activates the automatic emergency brake to avoid collision between the vehicle 1 and the oncoming vehicle.

The automatic emergency braking device 12 includes a collision determination unit 13, a brake control unit 14, and an execution timing change unit 15.

The collision determination unit 13 executes collision determination for determining whether or not there is a possibility of collision between the vehicle 1 and the oncoming vehicle. Specifically, the collision determination unit 13 acquires the steering angle of the vehicle 1 detected by the steering angle sensor 6. The collision determination unit 13 acquires the vehicle speed of the vehicle 1 detected by the vehicle speed sensor 7. The collision determination unit 13 acquires information on the estimated course of the vehicle 1 estimated by the course estimation unit 11. The collision determination unit 13 acquires the relative distance to the oncoming vehicle and the relative speed measured by the oncoming vehicle sensor 5. The collision determination unit 13 can acquire the yaw angle of the vehicle 1 with respect to the traveling lane of the vehicle 1 measured by the traveling lane sensor 4. The collision determination unit 13 executes entry determination to determine whether or not an entry condition indicating that the vehicle 1 enters the opposite lane is satisfied, on the basis of the acquired steering angle, yaw angle, or the like of the vehicle 1. When the entry condition is satisfied, the collision determination unit 13 executes the collision determination on the basis of the acquired estimated course of the vehicle 1, the relative distance to the oncoming vehicle, and the relative speed. Details of the collision determination will be described later with reference to FIG. 3.

When the prediction condition indicating that entry of the vehicle 1 to the opposite lane is predicted is satisfied, the execution timing change unit 15 changes the execution timing of the collision determination by the collision determination unit 13 to a timing earlier than that in the normal case where the prediction condition is not satisfied.

The execution timing change unit 15 includes a determination unit 16 that determines whether or not a prediction condition indicating that entry of the vehicle 1 to the opposite lane is predicted is satisfied, and a setting unit 17 that changes the execution timing of the collision determination according to a determination result of the determination unit 16.

The prediction condition is at least one of (A) that the vehicle 1 enters an intersection, (B) that the direction indicator 3 of the vehicle 1 gives notice of entry of the vehicle 1 into the opposite lane, (C) that the traveling lane of the vehicle 1 is a lane for entry into the opposite lane, and (D) that the vehicle 1 has a travel history of entering the opposite lane from the traveling lane of the vehicle 1.

The execution timing change unit 15 acquires the position information of the vehicle 1 acquired by the navigation device 2 and the map information and the travel history information stored in the navigation device 2. The execution timing change unit 15 acquires information that gives notice of a right or left turn of the vehicle 1 notified by the direction indicator 3. The execution timing change unit 15 acquires information on the traveling lane recognized by the traveling lane sensor 4.

The determination unit 16 determines whether or not the prediction condition is satisfied on the basis of the acquired information. For example, when the condition is (A), the determination unit 16 can determine whether or not the condition (A) is satisfied on the basis of the position information of the vehicle 1 and the map information. When the condition is (B), the determination unit 16 can determine whether or not the condition (B) is satisfied on the basis of the notice information of a right or left turn. When the condition is (C), the determination unit 16 can determine whether or not the condition (C) is satisfied on the basis of information of the traveling lane of the vehicle 1 or the position information and the map information. When the condition is (D), the determination unit 16 can determine whether or not the condition (D) is satisfied on the basis of the position information of the vehicle 1, the map information, and the travel history information.

The determination unit 16 may determine that the prediction condition is satisfied even when only the condition (B) among the conditions (A) to (D) is satisfied and the other conditions are not satisfied. The determination unit 16 may determine that the prediction condition is satisfied when two or more conditions other than the condition (B) among the conditions (A) to (D) are satisfied. Since the condition (B) has a higher degree of certainty that the vehicle 1 will enter the opposite lane than other conditions, the determination unit 16 determine that the prediction condition is satisfied when only the condition (B) is satisfied. The determination unit 16 outputs a determination result as to whether or not the prediction condition is satisfied to the setting unit 17.

In the case where the prediction condition is not satisfied, the setting unit 17 sets the execution timing of the collision determination to a predetermined normal timing. In the case where the prediction condition is satisfied, the setting unit 17 sets the execution timing of the collision determination to be earlier than usual. The setting unit 17 can change the execution timing of the collision determination according to the determination result of the determination unit 16.

The setting unit 17 changes a threshold set in the collision determination unit 13 to change the execution timing of the collision determination. The threshold set in the collision determination unit 13 is a threshold for distinguishing whether or not the entry condition is satisfied. That is, the execution timing change unit 15 changes the execution timing of the collision determination by changing the threshold for distinguishing whether or not the vehicle 1 enters the opposite lane.

The threshold is a value determined in advance for at least one of (1) a steering angle of the vehicle 1, (2) a temporal change in the steering angle, (3) a yaw angle of the vehicle 1 with respect to the traveling lane of the vehicle 1, and (4) a temporal change in the yaw angle.

The entry condition is at least one of (1) that a steering angle of the vehicle 1 is larger on the opposite lane side than the threshold, (2) that a temporal change in the steering angle is larger on the opposite lane side than the threshold, (3) that a yaw angle of the vehicle 1 with respect to a traveling lane of the vehicle 1 is larger on the opposite lane side than the threshold, and (4) that a temporal change in the yaw angle is larger on the opposite lane side than the threshold.

When the determination unit 16 determines that the prediction condition is not satisfied, the setting unit 17 sets a predetermined normal first threshold in the collision determination unit 13 as the threshold. When the determination unit 16 determines that the prediction condition is satisfied, the setting unit 17 sets a predetermined special second threshold in the collision determination unit 13 as the threshold. The second threshold is a value that is easier to distinguish that the vehicle 1 enters the opposite lane than the first threshold.

The collision determination unit 13 determines whether or not the entry condition is satisfied on the basis of the threshold (the first threshold or the second threshold) set by the setting unit 17. The collision determination unit 13 executes collision determination when the entry condition is satisfied. When the entry condition is not satisfied, the collision determination unit 13 suspends execution of the collision determination.

The present embodiment will be described on the assumption that the threshold is (1) a value $\theta h$ determined in advance with respect to the steering angle $\theta$ of the vehicle 1, and the entry condition is (1) that the steering angle $\theta$ of the vehicle 1 is larger on the opposite lane side than the threshold $\theta h$. In the case where the prediction condition is not satisfied, the setting unit 17 sets a normal first threshold $\theta h1$ as the threshold $\theta h$ in the collision determination unit 13. When the prediction condition is satisfied, the setting unit 17 sets a special second threshold value $\theta h2$ as the threshold value $\theta h$ in the collision determination unit 13. The second threshold $\theta h2$ is smaller than the first threshold $\theta h1$. Accordingly, when the prediction condition is satisfied, the collision determination unit 13 determines that the vehicle 1 enters the opposite lane (the entry condition is satisfied) from the stage where the steering angle $\theta$ of the vehicle 1 is small, and thus, executes the collision determination from the stage where the steering angle $\theta$ of the vehicle 1 is small. That is, when the prediction condition is satisfied, the collision determination unit 13 executes the collision determination from an earlier timing than the case where the prediction condition is not satisfied. In other words, when the prediction condition is satisfied, the execution timing change unit 15 changes the execution timing of the collision determination to be earlier than the timing in the case where the prediction condition is not satisfied. When the first threshold $\theta h1$ is a normal value, the second threshold $\theta h2$ can be said to be a value on the early execution side of the collision determination than the first threshold $\theta h1$.

The brake control unit 14 activates the automatic emergency brake of the vehicle 1 according to the determination result of the collision determination by the collision determination unit 13. When it is determined that there is a possibility of collision by the collision determination, the brake control unit 14 calculates a time required for the vehicle 1 to collide with the oncoming vehicle (hereinafter also referred to as "time-to-collision TTC"). The brake control unit 14 determines whether or not to activate the automatic emergency brake on the basis of the calculated time-to-collision TTC. When activating the automatic emergency brake, the brake control unit 14 calculates deceleration required for the vehicle 1 to avoid collision with the oncoming vehicle. The brake control unit 14 generates a braking command which is a control command for activating the automatic emergency brake according to the calculated deceleration, and outputs the braking command to the vehicle motion control device 20.

The vehicle motion control device 20 controls the motion of the vehicle 1 according to the control command output from the driving assistance control device 10. The vehicle motion control device 20 includes a brake actuator control unit 21 that controls a brake actuator 30. The brake actuator control unit 21 generates a drive control command for controlling driving of the brake actuator 30 accordance with the braking command output from the brake control unit 14 of the automatic emergency braking device 12, and outputs the drive control command to the brake actuator 30.

The brake actuator 30 includes a drive control device 31 that controls driving of each actuator constituting the brake actuator 30. The drive control device 31 drives each actuator in accordance with a drive control command output from the brake actuator control unit 21 of the vehicle motion control device 20. As a result, the automatic emergency brake of the vehicle 1 operates.

Figure 2:
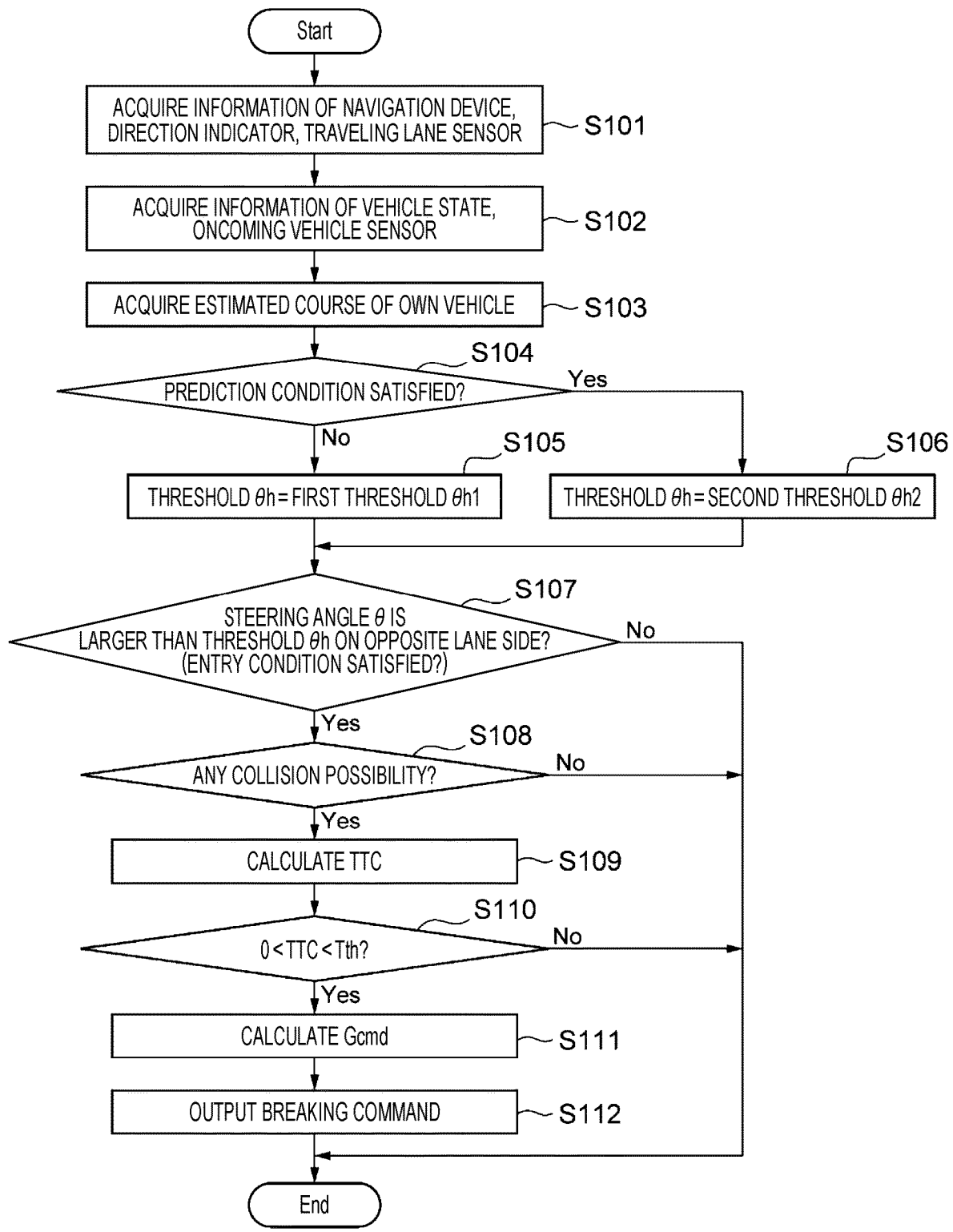
FIG. 2 is a flowchart showing processing performed by the automatic emergency braking device shown in FIG. 1.

FIG. 2 is a flowchart showing processing performed by the automatic emergency braking device 12 shown in FIG. 1. FIG. 3 is a diagram for explaining collision determination performed in step S108 illustrated in FIG. 2.

FIG. 2 illustrates an example of the case where the vehicle 1 traveling on a left-side main road with a relatively large traffic volume turns right at an intersection one ahead or an intersection two ahead while traveling on a lane where it is possible to turn right (for example, a right turn lane). The automatic emergency braking device 12 executes the processing illustrated in FIG. 2 every predetermined period (for example, 50 ms).

In step S101, the automatic emergency braking device 12 acquires information of the navigation device 2, the direction indicator 3, and the traveling lane sensor 4. Specifically, the automatic emergency braking device 12 acquires position information, map information, and travel history information of the vehicle 1 from the navigation device 2. The automatic emergency braking device 12 acquires, from the direction indicator 3, information giving notice of a right or left turn of the vehicle 1. The automatic emergency braking device 12 acquires information on the driving lane of the vehicle 1 from the traveling lane sensor 4.

In step S102, the automatic emergency braking device 12 acquires information of the state of the vehicle 1 and information of the oncoming vehicle sensor 5. Specifically, as the state of the vehicle 1, the automatic emergency braking device 12 acquires the steering angle of the vehicle 1 from the steering angle sensor 6, and acquires the vehicle speed of the vehicle 1 from the vehicle speed sensor 7. The automatic emergency braking device 12 acquires information on an oncoming vehicle and the opposite lane, and a relative distance and a relative speed between the vehicle 1 and the oncoming vehicle from the oncoming vehicle sensor 5.

In step S103, the automatic emergency braking device 12 acquires information on the estimated course of the vehicle 1 by the course estimation unit 11.

In step S104, the automatic emergency braking device 12 determines whether or not the prediction condition is satisfied. When the prediction condition is satisfied, the automatic emergency braking device 12 proceeds to step S106. When the prediction condition is not satisfied, the automatic emergency braking device 12 proceeds to step S105.

In step S105, the automatic emergency braking device 12 sets the normal first threshold θh1 as the threshold θh for distinguishing whether or not the vehicle 1 enters the opposite lane. Thereafter, the automatic emergency braking device 12 proceeds to step S107.

In step S106, the automatic emergency braking device 12 sets the second threshold θh2 smaller than the first threshold θh1 as the threshold θh for distinguishing whether or not the vehicle 1 enters the opposite lane.

In step S107, the automatic emergency braking device 12 determines whether or not the steering angle θ of the vehicle 1 is larger on the opposite lane side than the threshold θh. That is, the automatic emergency braking device 12 determines whether or not the entry condition is satisfied. When the entry condition is satisfied, the automatic emergency braking device 12 proceeds to step S108 to execute the collision determination. When the entry condition is not satisfied, the automatic emergency braking device 12 ends this process illustrated in FIG. 2 so as to suspend the execution of the collision determination.

In step S108, the automatic emergency braking device 12 determines whether or not there is a possibility of collision between the vehicle 1 and the oncoming vehicle, on the basis of the acquired information on the estimated course of the vehicle 1 and the relative distance and the relative speed between the vehicle 1 and the oncoming vehicle. That is, the automatic emergency braking device 12 executes collision determination.

Figure 3:
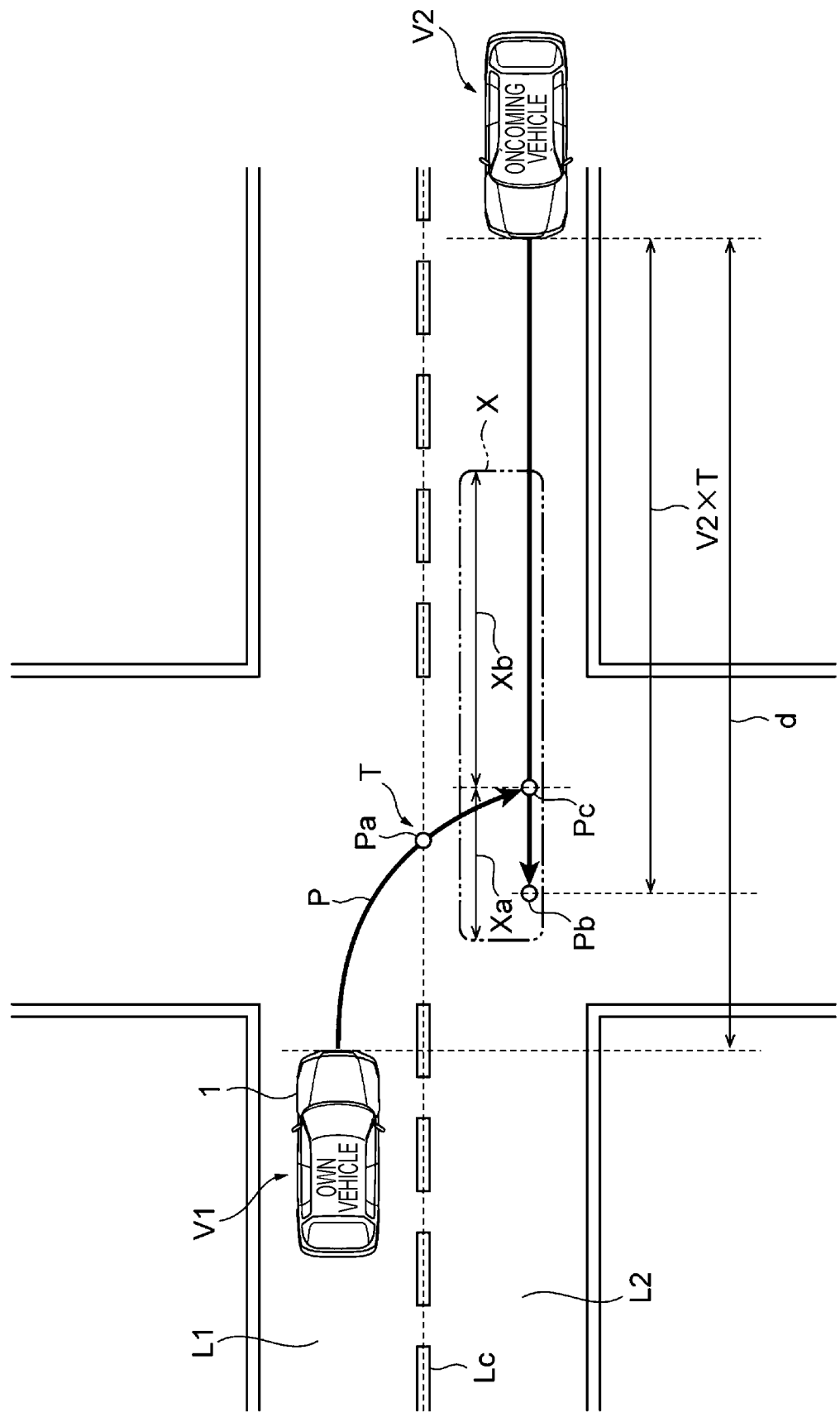
FIG. 3 is a diagram for explaining collision determination performed in step S108 illustrated in FIG. 2.

In FIG. 3, the vehicle 1 travels on a traveling lane L1 at a vehicle speed V1, and is about to turn right at the intersection through an estimated course P. The oncoming vehicle travels on an opposite lane L2 at a vehicle speed V2 and is located in front of the intersection. In FIG. 3, it is assumed that a relative distance between the vehicle 1 and the oncoming vehicle in a direction along the traveling lane L1 is "d". The relative speed between the vehicle 1 and the oncoming vehicle is defined as Vrel.

In FIG. 3, a position Pa is an intersection of the estimated course P of the vehicle 1 and a center line Lc which is a boundary line between the traveling lane L1 and the opposite lane L2. The position Pa indicates an entry position of the vehicle 1 into the opposite lane L2. In FIG. 3, the time required for the vehicle 1 to reach the entry position Pa is denoted by T. A position Pb indicates the position of the oncoming vehicle traveling at the vehicle speed V2 when the time T has elapsed. A position Pc is an intersection of the estimated course P of the vehicle 1 and the estimated course of the oncoming vehicle. The position Pc indicates a position at which the vehicle 1 and the oncoming vehicle are estimated to collide (hereinafter, also referred to as an "estimated collision position").

The collision determination unit 13 of the automatic emergency braking device 12 defines a collision possible area X based on the estimated collision position Pc which is the intersection of the estimated course P of the vehicle 1 and the estimated course of the oncoming vehicle. The collision possible area X is configured of a margin Xa predetermined in consideration of measurement errors of various sensors included in the vehicle 1 and a margin Xb predetermined in consideration of measurement errors of various sensors included in the vehicle 1 and a vehicle length equivalent value of the oncoming vehicle. The margin Xa is a portion of the collision possible area X extending to the side of the vehicle 1 with respect to the estimated collision position Pc, and the margin Xb is a portion of the collision possible area X extending to the side of the oncoming vehicle with respect to the estimated collision position Pc.

The collision determination unit 13 determines that there is a possibility of collision if the position Pb of the oncoming vehicle when the time T elapses exists in the collision possible area X. The collision determination unit 13 determines that there is no possibility of collision if the position Pb of the oncoming vehicle when the time T elapses does not exist in the collision possible area X. When there is a possibility of collision, the automatic emergency braking device 12 proceeds to step S109. The automatic emergency braking device 12 ends the present processing illustrated in FIG. 2 to suspend activation of the automatic emergency brake.

In step S109, the automatic emergency braking device 12 calculates the time-to-collision TTC required for the vehicle 1 to collide with the oncoming vehicle. In the case where collision with the oncoming vehicle occurs when the vehicle 1 enters the opposite lane, the yaw angle of the vehicle 1 when the vehicle 1 enters the opposite lane is relatively small. Therefore, among the influences of the displacement of the vehicle 1 until colliding with the oncoming vehicle on the time-to-collision TTC, the influence of the displacement in the lateral direction is negligibly small, and the influence of the displacement in the straight traveling direction (direction along the traveling lane) is dominant. Therefore, the automatic emergency braking device 12 can calculate the time-to-collision TTC using the following Expression (1). The relative distance between the vehicle 1 and the oncoming vehicle in the direction along the traveling lane L1 is denoted by "d", and the relative speed between the vehicle 1 and the oncoming vehicle is denoted by Vrel.

$$TTC=d/Vrel \qquad (1)$$

In step S110, the automatic emergency braking device 12 determines whether or not the calculated time-to-collision TTC satisfies the following Expression (2).

$$0<TTC<Tth \qquad (2)$$

A threshold Tth is a threshold for distinguishing whether or not to activate the automatic emergency brake of the vehicle 1. The threshold Tth can be calculated from the following Expression (3) using the average braking deceleration Gave at the vehicle speed V1 of the vehicle 1.

$$Tth=V1/(2Gave) \qquad (3)$$

For example, when the vehicle speed V1 of the vehicle 1 is 11.1 [m/s] and the average braking deceleration Gave is 4.9 [m/s$^2$] (that is, 0.5 G), the threshold value Tth is 1.1 [s].

When the time-to-collision TTC satisfies Expression (2), that is, when the time-to-collision TTC is less than the threshold Tth, the automatic emergency braking device 12 proceeds to step S111 to activate the automatic emergency braking. When the time-to-collision TTC does not satisfy Expression (2), that is, when the time-to-collision TTC is equal to or larger than the threshold Tth, the automatic emergency braking device 12 ends the present processing illustrated in FIG. 2 so as to suspend activation of the automatic emergency braking.

In step S111, the automatic emergency braking device 12 calculates deceleration Gcmd required for the vehicle 1 to avoid collision with the oncoming vehicle. In the case where collision with an oncoming vehicle occurs when the vehicle 1 enters the opposite lane, the vehicle 1 needs to stop before entering the opposite lane, and the yaw angle of the vehicle 1 before the vehicle 1 enters the opposite lane is relatively small. Therefore, among the influences of the displacement of the vehicle 1 until the vehicle 1 stops before entering the opposite lane on the deceleration Gcmd, the influence of the displacement in the lateral direction is negligibly small, and the influence of the displacement in the straight traveling direction (direction along the traveling lane) is dominant. Therefore, the automatic emergency braking device 12 can calculate the deceleration Gcmd using the following Expression (4).

$$Gcmd=(V1\times Vrel)/(2d) \qquad (4)$$

In step S112, the automatic emergency braking device 12 generates a braking command for activating the automatic emergency brake according to the calculated deceleration Gcmd, and outputs the braking command to the vehicle motion control device 20. Thereafter, the automatic emergency braking device 12 ends the present processing illustrated in FIG. 2.

As described above, the automatic emergency braking device 12 according to the first embodiment includes: the collision determination unit 13 that executes collision determination for determining whether or not there is a possibility of collision between the vehicle 1 and an oncoming vehicle; the brake control unit 14 that activates the automatic emergency brake of the vehicle 1 according to the determination result of the collision determination; and the execution timing change unit 15 that changes the execution timing of the collision determination. The execution timing change unit 15 includes the determination unit 16 that determines whether or not a prediction condition indicating that entry of the vehicle 1 to the opposite lane is predicted is satisfied, and the setting unit 17 that, when the prediction condition is satisfied, sets the execution timing of the collision determination to be earlier than the timing in the case where the prediction condition is not satisfied.

That is, when the vehicle 1 is predicted to enter the opposite lane in advance, the automatic emergency braking device 12 according to the first embodiment can set the activation timing of the automatic emergency brake that is activated when it is determined that there is a possibility of collision by the collision determination, to be earlier than usual. Accordingly, when entry into the opposite lane is predicted in advance, the automatic emergency braking device 12 according to the first embodiment can prevent delay of activation of the automatic emergency brake even when the vehicle speed is high. Further, when entry of the vehicle 1 into the opposite lane is not predicted in advance, the automatic emergency braking device 12 of the first embodiment can set the activation timing of the automatic emergency brake to a normal timing carefully determined so as to prevent occurrence of malfunction. As a result, the automatic emergency braking device 12 according to the first embodiment can prevent malfunction from occurring when entry into the opposite lane is not predicted in advance. Therefore, the automatic emergency braking device 12 according to the first embodiment can achieve both prevention of delay and prevention of malfunction of the automatic emergency brake when the vehicle enters the opposite lane.

Further, in the automatic emergency braking device 12 according to the first embodiment, the execution timing change unit 15 changes the execution timing of the collision determination by changing a threshold for distinguishing whether or not the vehicle 1 enters the opposite lane. The setting unit 17 sets a first threshold as a threshold in the collision determination unit 13 when the prediction condition is not satisfied, and sets a second threshold that is easier to distinguish when the vehicle 1 enters the opposite lane than the first threshold as a threshold in the collision determination unit 13 when the prediction condition is satisfied. The collision determination unit 13 determines whether or not an entry condition indicating that the vehicle 1 enters the opposite lane is satisfied based on the threshold set by the setting unit 17. The collision determination unit 13 executes the collision determination when the entry condition is satisfied, and suspends execution of the collision determination when the entry condition is not satisfied.

As a result, when entry of the vehicle 1 into the opposite lane is predicted in advance, the automatic emergency braking device 12 according to the first embodiment can determine whether or not the vehicle 1 actually enters the opposite lane (whether or not the entry condition is satisfied) on the basis of a stricter criterion than usual. Furthermore, in the case where entry of the vehicle 1 into the opposite lane is not predicted in advance, the automatic emergency braking device 12 according to the first embodiment can determine whether or not the vehicle 1 actually enters the opposite lane on the basis of a normal criterion carefully determined so as to prevent occurrence of malfunction. When the vehicle 1 actually enters the opposite lane, the automatic emergency braking device 12 according to the first embodiment can execute the collision determination to activate the automatic emergency brake. When the vehicle 1 does not actually enter the opposite lane, the automatic emergency braking device 12 can suspend execution of the collision determination to suspend activation of the automatic emergency brake. Therefore, the automatic emergency braking device 12 of the first embodiment can reliably and early activate the automatic emergency brake in a situation where the automatic emergency brake should be activated early, and can reliably prevent the automatic emergency brake from being activated when activation of the automatic emergency brake becomes unnecessary. Therefore, the automatic emergency braking device 12 of the first embodiment can more reliably achieve both prevention of delay and prevention of malfunction of the automatic emergency brake when the vehicle enters the opposite lane.

Further, in the automatic emergency braking device 12 according to the first embodiment, the prediction condition is at least one of (A) that the vehicle 1 enters the intersection, (B) that the direction indicator 3 of the vehicle 1 gives notice of entry of the vehicle 1 into the opposite lane, (C) that the traveling lane of the vehicle 1 is a lane for entry into the opposite lane, and (D) that the vehicle 1 has a travel history of entering the opposite lane from the traveling lane of the vehicle 1.

As a result, the automatic emergency braking device 12 according to the first embodiment can determine whether or not the vehicle 1 is predicted to enter the opposite lane only by simply processing information from sensors and devices equipped in the existing vehicle 1 and the driving assistance device. Therefore, the automatic emergency braking device 12 according to the first embodiment can easily achieve both prevention of delay and prevention of malfunction of the automatic emergency brake when the vehicle enters the opposite lane.

Further, in the automatic emergency braking device 12 according to the first embodiment, the threshold for distinguishing whether or not the vehicle 1 enters the opposite lane is a value determined in advance for at least one of (1) the steering angle of the vehicle 1, (2) the temporal change of the steering angle, (3) the yaw angle of the vehicle 1 with respect to the traveling lane of the vehicle 1, and (4) the temporal change of the yaw angle. The entry condition is at least one of (1) that a steering angle of the vehicle 1 is larger on the opposite lane side than the threshold, (2) that a temporal change in the steering angle is larger on the opposite lane side than the threshold, (3) that a yaw angle of the vehicle 1 with respect to a traveling lane of the vehicle 1 is larger on the opposite lane side than the threshold, and (4) that a temporal change in the yaw angle is larger on the opposite lane side than the threshold.

As a result, the automatic emergency braking device 12 according to the first embodiment can determine whether or not the vehicle 1 actually enters the opposite lane only by simply processing information from sensors and devices equipped in the existing vehicle 1 and the driving assistance device. Therefore, the automatic emergency braking device 12 according to the first embodiment can easily achieve both prevention of delay and prevention of malfunction of the automatic emergency brake when the vehicle enters the opposite lane.

Second Embodiment

An automatic emergency braking device 12 according to a second embodiment be described with reference to FIG. 4.

In the automatic emergency braking device 12 of the second embodiment, the description of the same configuration and operation as those of the first embodiment will be omitted.

The automatic emergency braking device 12 according to the second embodiment is different from that according to the first embodiment in terms of the configurations of the determination unit 16 and the setting unit 17 of the execution timing change unit 15. After the prediction condition is satisfied, the determination unit 16 of the second embodiment determines whether or not a reset condition indicating that satisfaction of the prediction condition is reset is established. When the reset condition is satisfied, the setting unit 17 of the second embodiment sets a first threshold in the collision determination unit 13 as a threshold for distinguishing whether or not the entry condition is satisfied. When the reset condition is not satisfied, the setting unit 17 of the second embodiment sets a second threshold in the collision determination unit 13 as a threshold for distinguishing whether or not the entry condition is satisfied.

The reset condition is at least one of that a predetermined time or more has elapsed after the prediction condition is satisfied, that the vehicle 1 has traveled a predetermined distance or more after the prediction condition is satisfied, and that the vehicle 1 has traveled at a predetermined speed or more after the prediction condition is satisfied.

Figure 4:
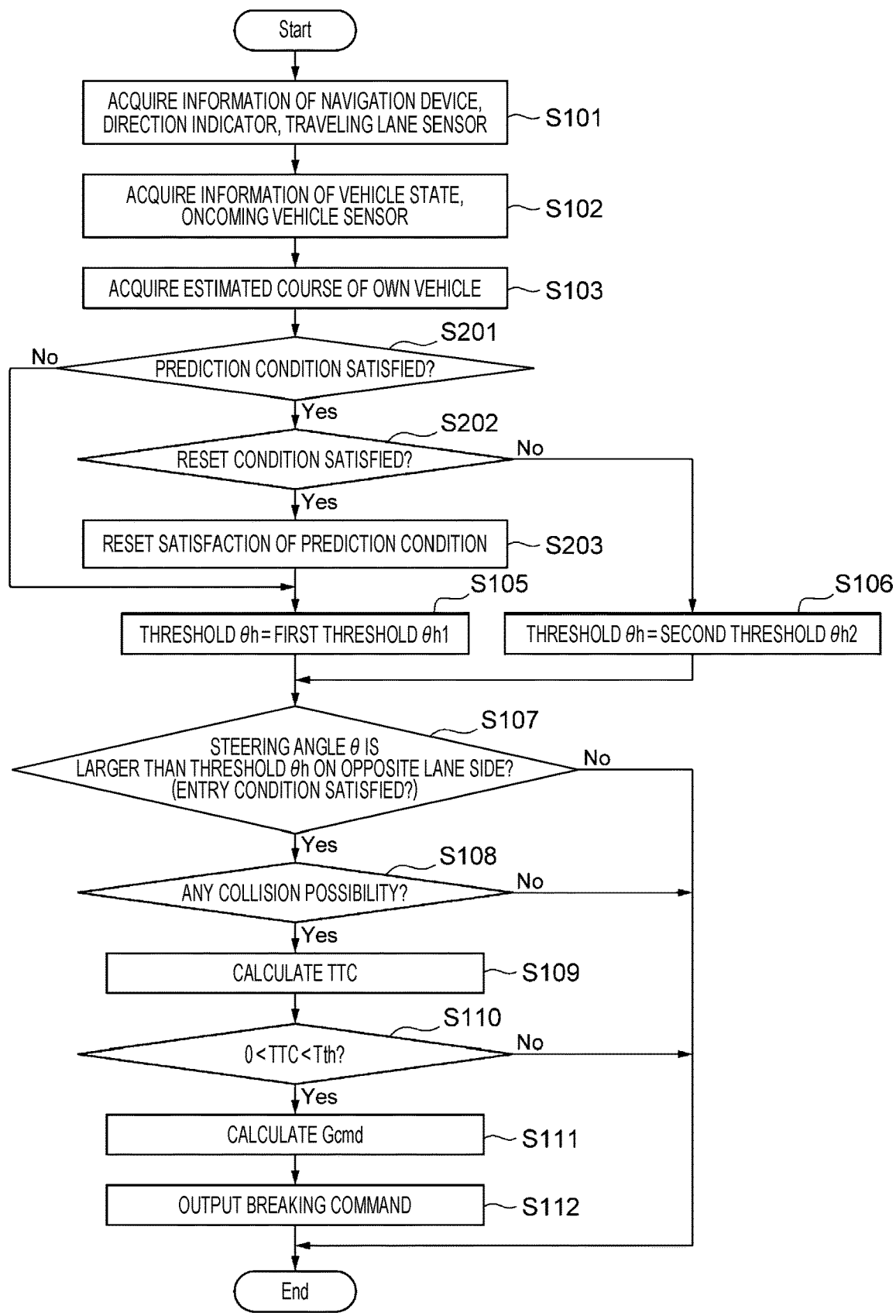
FIG. 4 is a flowchart showing processing performed by an automatic emergency braking device according to a second embodiment.

FIG. 4 is a flowchart showing processing performed by the automatic emergency braking device 12 according to the second embodiment.

In steps S101 to S103, the automatic emergency braking device 12 performs processing similar to that in steps S101 to S103 illustrated in FIG. 2.

In step S201, the automatic emergency braking device 12 determines whether or not the prediction condition is satisfied. When the prediction condition is satisfied, the automatic emergency braking device 12 proceeds to step S202. When the prediction condition is not satisfied, the automatic emergency braking device 12 proceeds to step S105.

In step S202, the automatic emergency braking device 12 determines whether or not a reset condition is satisfied. When the reset condition is satisfied, the automatic emergency braking device 12 proceeds to step S203. When the reset condition is not satisfied, the automatic emergency braking device 12 proceeds to step S106.

In step S203, the automatic emergency braking device 12 resets satisfaction the prediction condition. Thereafter, the automatic emergency braking device 12 proceeds to step S105.

In steps S105 to S112, the automatic emergency braking device 12 performs processing similar to that in steps S105 to S112 illustrated in FIG. 2. Thereafter, the automatic emergency braking device 12 ends the present processing illustrated in FIG. 4.

In the case where the vehicle 1 does not enter the opposite lane as in the case where the vehicle 1 crosses the opposite lane or the case where the vehicle 1 stops entering the opposite lane and goes straight, if the state in which the execution timing of the collision determination is set earlier than usual continues, the collision determination is executed even if the steering for correcting the meandering driving is performed, and the possibility that malfunction in which the automatic emergency brake is activated occurs is not zero.

As described above, the setting unit 17 according to the second embodiment sets the first threshold in the collision determination unit 13 when the reset condition is satisfied, and sets the second threshold in the collision determination unit 13 when the reset condition is not satisfied. That is, the execution timing change unit 15 of the second embodiment can return the execution timing of the collision determination to the normal timing when the reset condition is satisfied after the prediction condition is satisfied. Therefore, the automatic emergency braking device 12 according to the second embodiment can reliably prevent occurrence of malfunction of the automatic emergency brake due to continuation of a state in which the execution timing of the collision determination is set earlier than usual. Therefore, the automatic emergency braking device 12 according to the second embodiment can achieve both prevention of delay and prevention of malfunction of the automatic emergency brake when the vehicle enters the opposite lane, and can prevent malfunction when the vehicle does not enter the opposite lane.

Further, in the automatic emergency braking device 12 of the second embodiment, the reset condition is at least one of that a predetermined time or more has elapsed after the prediction condition is satisfied, that the vehicle 1 has traveled a predetermined distance or more after the prediction condition is satisfied, and that the vehicle 1 has traveled at a predetermined speed or more after the prediction condition is satisfied.

As a result, the automatic emergency braking device 12 according to the second embodiment can determine whether or not to reset satisfaction of the prediction condition by only simply processing the information from sensors and devices equipped in the existing vehicle 1 and the driving assistance device. Therefore, the automatic emergency braking device 12 according to the second embodiment can easily achieve prevention of malfunction of the automatic emergency brake when the vehicle does not enter the opposite lane.

[Others]

Note that the present invention is not limited to the above-described embodiments, but includes various modifications. For example, the above-described embodiments are described in detail to explain the present invention in an easy-to-understand manner, and are not necessarily limited to those having all the described configurations. Further, part of the configuration of one embodiment can be replaced with the configuration of another embodiment, and the configuration of another embodiment can be added to the configuration of one embodiment. Moreover, it is possible to add, delete, and replace other configurations for part of the configurations of the respective embodiments.

Each of the above-described configurations, functions, processing units, processing means, and the like may be realized by hardware by designing a part or all of them with, for example, an integrated circuit. Further, each configuration, function, and the like described above may be realized by software by the processor interpreting and executing a program that realizes each function. Information such as programs, tapes, and files for realizing each function can be stored in a memory, a hard disk, a recording device such as a solid state drive (SSD), or a recording medium such as an IC card, an SD card, or a DVD.

Further, regarding control lines and information lines, those considered to be necessary for the description are shown, and all control lines and information lines in the product are not necessarily shown. In practice, almost all configurations may be considered to be mutually connected.

REFERENCE SIGNS LIST 1 vehicle (own vehicle)
3 direction indicator
12 automatic emergency braking device
13 collision determination unit
14 brake control unit
15 execution timing change unit
16 determination unit
17 setting unit
L1 traveling lane
L2 opposite lane

The invention claimed is:

1. An automatic emergency braking device comprising:
a collision determination unit that executes collision determination to determine whether or not there is a possibility of collision between an own vehicle and an oncoming vehicle;
a brake control unit that activates an automatic emergency brake of the own vehicle according to a determination result of the collision determination; and
an execution timing change unit that changes an execution timing of the collision determination,
wherein the execution timing change unit includes:
a determination unit that determines whether or not a prediction condition indicating that entry of the own vehicle to an opposite lane is predicted is satisfied; and
a setting unit that, when the prediction condition is satisfied, sets the execution timing of the collision determination to be earlier than a timing in a case in which the prediction condition is not satisfied,
wherein the execution timing change unit changes the execution timing of the collision determination by changing a threshold for distinguishing whether or not the own vehicle enters the opposite lane,
wherein the setting unit
sets a first threshold as the threshold in the collision determination unit when the prediction condition is not satisfied, and
sets, as the threshold, a second threshold with which it is more easily distinguishable that the own vehicle enters the opposite lane than the first threshold, in the collision determination unit when the prediction condition is satisfied, and
wherein the collision determination unit
determines whether or not an entry condition indicating that the own vehicle enters the opposite lane is satisfied, on a basis of the threshold set by the setting unit,
executes the collision determination when the entry condition is satisfied, and
suspends execution of the collision determination when the entry condition is not satisfied.

2. The automatic emergency braking device according to claim 1, wherein
the determination unit determines whether or not a reset condition indicating resetting satisfaction of the prediction condition is satisfied, and
the setting unit
sets the first threshold in the collision determination unit as the threshold when the reset condition is satisfied, and
sets the second threshold in the collision determination unit as the threshold when the reset condition is not satisfied.

3. The automatic emergency braking device according to claim 2, wherein the reset condition is at least one of that a predetermined time or more has elapsed after the prediction condition is satisfied, that the own vehicle has traveled a predetermined distance or more after the prediction condition is satisfied, and that the own vehicle has traveled at a predetermined speed or higher after the prediction condition is satisfied.

4. The automatic emergency braking device according to claim 1, wherein the prediction condition is at least one of that the own vehicle enters an intersection, that a direction indicator of the own vehicle gives notice of entry of the own vehicle into the opposite lane, that a traveling lane of the own vehicle is a lane for entering the opposite lane, and that the own vehicle has a travel history of entering the opposite lane from the traveling lane of the own vehicle.

5. The automatic emergency braking device according to claim 1, wherein
   the threshold is a value determined in advance for at least one of a steering angle of the own vehicle, a temporal change in the steering angle, a yaw angle of the own vehicle with respect to the traveling lane of the own vehicle, and a temporal change in the yaw angle, and
   the entry condition is at least one of that the steering angle is larger than the threshold toward the opposite lane, that the temporal change of the steering angle is larger than the threshold toward the opposite lane, that the yaw angle is larger than the threshold toward the opposite lane, and that the temporal change of the yaw angle is larger than the threshold toward the opposite lane.

* * * * *